July 4, 1944. I. J. SNADER 2,352,662
DRESSING MECHANISM FOR GRINDING WHEELS
Original Filed Aug. 3, 1940
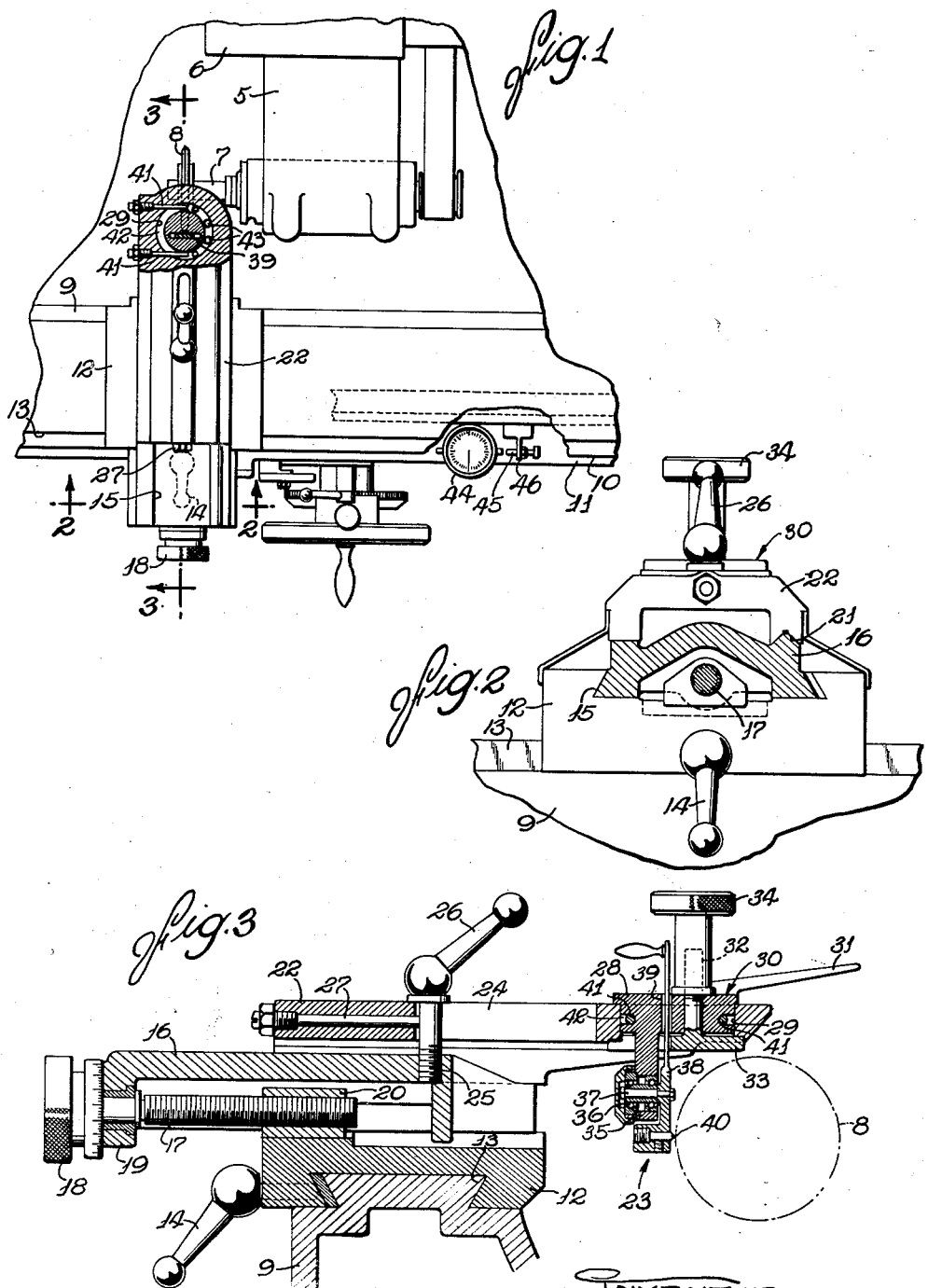
INVENTOR
Ira J. Snader
By Parker, Carlson, Pitzner & Hubbard
ATTORNEYS Patented July 4, 1944

2,352,662

UNITED STATES PATENT OFFICE 2,352,662

DRESSING MECHANISM FOR GRINDING WHEELS

Ira J. Snader, Detroit, Mich., assignor to Ex-Cell-O Corporation, Detroit, Mich., a corporation of Michigan Original applications December 2, 1937, Serial No. 177,693, and August 3, 1940, Serial No. 350,362. Divided and this application July 28, 1941, Serial No. 404,289

4 Claims. (Cl. 125—11)

The present invention relates to improvements in dressing mechanisms for grinding wheels, and has particular reference to such mechanisms adapted for use in machine tools.

One of the objects of the invention is to provide a novel dressing mechanism which is quickly, conveniently and accurately adjustable to provide the grinding wheel selectively with different cutting contours.

Another object resides in the provision of a new and improved dressing mechanism which is adjustable relative to the grinding wheel and which may be quickly actuated into and out of dressing position without disturbing the dressing adjustment.

Other objects and advantages will become apparent as the description proceeds.

In the accompanying drawing,

Figure 1 is a plan view, partially in horizontal section, of a dressing mechanism embodying the features of my invention.

Fig. 2 is a vertical sectional view taken along line 2—2 of Fig. 1.

Fig. 3 is a vertical sectional view taken along line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The dressing mechanism constituting the exemplary embodiment of the present invention, although not limited in its broad aspects to any particular type of grinding machine, is especially suited for a machine adapted to grind internal threads. Such a machine is disclosed in detail in my copending application Serial No. 177,693, filed December 2, 1937, (Patent No. 2,251,961, dated August 12, 1941). The machine is adapted also for grinding external screw threads and is converted for internal grinding by the substitution of a suitable spindle structure. In the present instance this structure comprises a split bracket 5 removably mounted on the front of a tool fixture 6, and supporting a tool spindle 7. One end of the spindle 7 projects laterally from the bracket 6, and supports an internal grinding wheel 8. The dressing mechanism for the internal grinding wheel 8 is adapted to be mounted on a headstock 9 on a work table 10 reciprocable on the machine base 11, and normally adapted to support a work blank (not shown) for rotation and for longitudinal reciprocation. A dressing mechanism for an external grinding wheel is disclosed and claimed in my copending application, Serial No. 350,362, filed August 3, 1940, of which the present application is a division.

The dressing mechanism herein shown comprises a base slide 12 mounted on ways 13 for adjustment longitudinally of the headstock 9, and adapted to be secured in position of adjustment by a clamp screw 14. The base slide 12 is formed on the top with transverse ways 15 supporting an adjusting slide 16 for movement toward and from the grinding wheel 8. An adjusting screw 17, provided with a graduated hand knob 18, is rotatably anchored in a depending lug 19 on the front end of the slide 16, and is in threaded engagement with a fixed nut 20 on the slide 12.

Mounted on ways 21 on the slide 16 for quick adjustment into and out of dressing position is a retracting slide 22 supporting a hand dresser 23. The slide 22 is formed with an elongated longitudinal slot 24. A clamp bolt 25, with a hand lever 26, extends through the slot 24 and into threaded engagement with the slide 16, and is adapted to lock the slide 22 in position of adjustment. A pin 27 extends through the slide 22 into the outer end of the slot 24, and is adapted for engagement with the bolt 25 to locate the dresser 23 in operative position. Accurate dressing adjustment is obtained by means of the fine screw 17, while the pin 27 is against the stud 25. Thereafter, the dresser 23 may be retracted to clear the bracket 5 by simply loosening the bolt 25 and moving the slide 22 forwardly as permitted by the slot 24, and may be quickly returned into operative position, as determined by engagement of the pin 27 with the bolt, without requiring adjustment of the screw 17.

The dresser 23 comprises a swivel plate 28 which is mounted in a bore 29 opening through the rear end of the slide 22 for rotary adjustment about a vertical axis. The plate is located to extend across the plane of the wheel adjacent to the periphery thereof and the plate axis intersects the plane of the wheel and is substantially perpendicular to the wheel axis. The plate 28 has a graduated flange 30 overlying the slide 22, and a hand lever 31 for facilitating adjustment. A stud 32 extends through the swivel plate 28 and has a locking flange 33 underlying the slide 22. A knurled knob 34 is threaded onto the upper end of the stud 32, and when tightened serves to secure the plate 28 in position of adjustment.

The plate 28 is formed with a depending eccentric bracket 35. Mounted in antifriction bearings 36 in the lower end of the bracket 35 is a pivot shaft 37 supporting a generally vertical lever 38. This lever projects upwardly through a slot 39 in the plate 28, and at the lower end supports an adjustable dressing tool 40 in opposition to the periphery of the wheel. The path described by the tool lies about on an axial plane of the wheel.

The swivel plate 28 is adjustable through 180 degrees to permit location of the tool 40 in different selective dressing positions. Suitable accurately adjustable stops 41 are provided for locating the tool 40 quickly in position for dressing the oppositely inclined faces of the grinding wheel 8. These stops comprise two fine thread parallel screws (see Fig. 1) which are threaded in the slide 22 to extend into opposite sides of the bore 29, and project tangentially into an annular groove 42 in the swivel plate 28 for engagement respectively with limit pins 43. Each of the pins 43 is threaded vertically through the groove 42 into a tapered seat which eliminates any error due to clearance. To dress the root cutting face of the wheel 8, the swivel plate 28 is adjusted into a position intermediate the flank cutting positions with the aid of the graduated flange 30.

The dressing attachment is approximately aligned with the grinding wheel 8 by movement of the table 10 into position. The final precise adjustment is made with an indicator 44. This indicator is mounted on the base section 11, and is adapted for engagement by a contact screw 45 adjustably mounted in a bracket 46 on the table 10. Then the dresser is actuated to true the wheel 8.

I claim as my invention:

1. A dressing mechanism comprising, in combination, a support, a member slidable on said support, a feed slide mounted on said member for movement transversely of said member, means for adjusting said slide, a quick-adjustment slide mounted on said feed slide for movement transversely of said member and formed with a longitudinal slot, a clamp bolt extending through said slot into threaded engagement with said feed slide, a stop pin adjustably threaded into one end of said slot and adapted to coact with said bolt to locate said quick-adjustment slide in operative position, and a dressing device mounted on said quick-adjustment slide.

2. A dressing mechanism for grinding wheels comprising, in combination, a support formed with a bore, a circular plate rotatably mounted in said bore and formed with a peripheral groove, two limit stop pins adjustably threaded through said support tangentially into opposite sides of said groove, two pins adapted to be inserted in different selective positions in said plate to project into said groove for engagement respectively with said stop pins to define opposite limit positions of said plate, means for securing said plate in a selected position of adjustment, a bracket on said plate, and a dressing tool holder operatively mounted on said bracket.

3. In a dressing mechanism of the character described, the combination of a pair of superimposed slides movable toward and away from a grinding wheel on a line generally perpendicular to the axis thereof, means for accurately determining the position of said slides as a unit, one of said slides being freely movable relative to the other between advanced and retracted positions, an adjustable abutment carried by one slide and engageable with the other slide for determining the advanced position of the freely movable slide, clamping means for securing the freely movable slide against such movement, a dressing tool pivotally mounted on the rapidly movable slide, and means for actuating said tool through a dressing stroke.

4. In a dressing mechanism of the character described, the combination of a pair of superimposed slides movable toward and away from a grinding wheel on a line paralleling the plane thereof, means for accurately determining the position of said slides as a unit, means providing for limited free sliding movement of one of said slides relative to the other and with respect to such accurately determined position, releasable means for securing the slides together, a member mounted at the end of the freely movable slide adjacent the grinding wheel for circular adjustment substantially in the plane of said slide, an eccentric arm extending from said member to a radially outward position relative to the periphery of the grinding wheel, and a dressing tool pivotally mounted on said arm for swinging movement across the surface to be dressed as determined by the circular adjustment of said member.

IRA J. SNADER.